Figure 1:
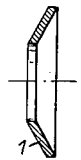

FIG. 17

INVENTOR.
H. Hermanus

June 20, 1961

H. HERMANUS 2,989,327

ASSEMBLY COMPRISING MACHINE ELEMENT
CONSISTING OF AN ANNULAR DISC

Filed Sept. 10, 1957

2 Sheets-Sheet 2

INVENTOR.
H. Hermanus
BY
Glascock Downing Seebold
ATTYS.

United States Patent Office 2,989,327
Patented June 20, 1961

2,989,327
ASSEMBLY COMPRISING MACHINE ELEMENT CONSISTING OF AN ANNULAR DISC
Heinrich Hermanus, Innsbruck, Austria, assignor to F. M. Tarbuk & Co., Vienna, Austria, a firm
Filed Sept. 10, 1957, Ser. No. 683,031
Claims priority, application Austria Sept. 12, 1956
1 Claim. (Cl. 287—52)

This invention relates to a machine element consisting of an annular disc in the shape of a truncated cone, which element is clamped under the action of an adjustable axial pressure in the annular space between two machine members, e.g., the cylindrical inside periphery of a hollow shaft, bushing or the like and the cylindrical outside periphery of a shaft, axle, pin or the like. The essential feature of the invention resides in that the annular disc consists of elastic high-strength plastic. The axial pressure applied tends to flatten the disc and imparts a resilient radial stress thereto, whereby the outer rim of the disc is snugly urged against the inside periphery of the one machine member and the inner rim of the disc is snugly urged against the outside periphery of the second machine member. Depending on the amount of pressure applied the elements according to the invention act preferably in pairs arranged in the shape of a roof as a coupling for transmitting a torque between the two machine members, or they serve as sealing elements (as a sealing set) in the annular space between the two machine members, which may rotate relative to each other or may be relatively slidably arranged. Finally, the discs may be used as bearing members or as a bearing set in a plain bearing.

In this specification and the appended claims, the term "high-strength elastic plastic" includes plastic materials having an ultimate tensile stress of at least 660 kg./sq. cm., a modulus of elasticity of at least 10,000 kg./sq. cm. and a ball-indentation hardness (Brinell hardness) of at least 600 kg./sq. cm. Examples of plastics which are covered by this definition are polyamides of the general formula $(OC-R_1-CO-HN-R_2-NH)_x$ or $$(HN-R-CO-HN-R-CO)_x$$

wherein R and $R_1$ represent aliphatic hydrocarbon residues having 6 carbon atoms and $R_2$ represents an aliphatic hydrocarbon residue having 4 to 6 carbon atoms. To provide the required strength and elasticity, the degree of polymerization of these polyamides should correspond to a molecular weight of at least 150,000. Polyamides of the type described hereinbefore may be produced by subjecting adipic acid and hexamethylene diamine to polycondensation, followed preferably by a heat treatment of the polycondensate at 180° C. for approximately 15 hours. To impart lubricating or emergency running properties to the discs, the plastic composition may include graphite.

Annular discs in the shape of a truncated cone have already been disclosed for sealing purposes but are made of deformable metal, preferably of lead and suffer permanent deformation under the action of axial pressure whereas the machine elements according to the invention are made of elastic, high-strength plastic and spring back to their initial shape after the axial pressure has been eliminated which sets up radial stresses in the disc.

For coupling purposes, annular discs in the shape of truncated cones and made of sheet metal have been proposed, which have slots beginning alternatingly from their inner and outer edges and in which radial stresses are set up when an axial pressure is applied, which stresses urge the outer and inner rims of the annular discs against the inside and outside peripheries, respectively, of the machine members to be coupled. As contrasted therewith the machine elements according to the invention consist of solid-wall annular discs of plastics, which can be manufactured much more simply and compared to the slotted sheet metal discs ensure a perfectly continuous, uniform engagement under pressure throughout their inner and outer rim.

The machine elements according to the invention have the additional advantage, which is due to the selected material of construction, that they will resist all liquids used in the operation of the machine, such as oils, gasoline (petrol), soap suds and the like and that they have a very small wear, themselves when in frictional engagement with metals whereas the metal parts are not worn at all. In this connection it must be borne in mind that the machine members which are coupled, carried or sealed with the aid of the elements according to the invention are not in contact with each other and that the annular discs according to the invention, which are used as coupling, bearing or sealing elements may readily be replaced individually if this is necessary owing to wear or breakage.

In the accompanying drawings,
FIGS. 1 to 12 show several embodiments of the machine element according to the invention.
FIGS. 13 to 23 show various applications in sectional views.

The simplest form of the machine element according to the invention, shown in FIG. 1, consists of a conical disc 1 of plastic.

Figure 2:
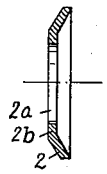
Figure 3:
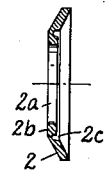

The conical disc 2 shown in FIG. 2 has adjacent to its inner bore 2a a flat annular disc portion 2b, which is at right angles to the axis of the disc and enables the disc to be clamped by a ring or annular machine member without distortion of the disc. To increase its elasticity, the disc shown in FIG. 3 may be provided on the inside with an annular groove 2c at the transition from part 2 to part 2b.

Figure 4:
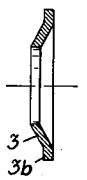
Figure 5:
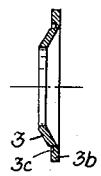
Figure 6:
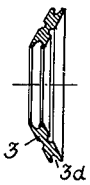
Figure 7:
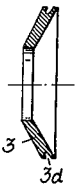
Figure 8:
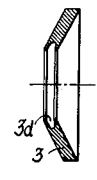
Figure 9:
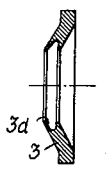
Figure 10:
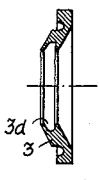
Figure 11:
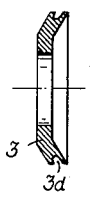
Figure 12:
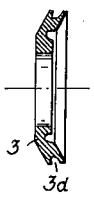

According to FIG. 4 the part 3b which is at right angles to the axis of the disc forms the outer rim of the disc and according to FIG. 5 an annular groove 3c may again be provided at the transition on the inside.

The groove at the transition may be provided on the outside or may be interrupted so that only recesses in the form of ring segments are provided. In another embodiment, not shown, the disc could be formed with a corrugation.

To increase the elasticity and/or for providing a reservoir space for a permanent lubricant the disc 3 could be provided at its outer rim and/or at its inner rim with at least one additional groove 3d, as is shown by way of examples in FIGS. 5 to 12.

The machine elements according to the invention may be standardized for the various bores and outside diameters of the machine members with which they are used, with an allowance for the tolerances permissible in each case. Owing to the elasticity of the elements and their ability to be deformed by being clamped these tolerances may be very large.

Figure 13:
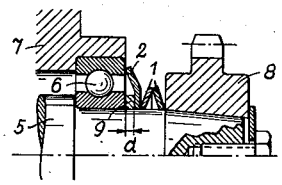

According to FIG. 13 the shaft 5 is rotatably mounted by means of a ball bearing 6 in the bearing body 7 and carries at the end a sprocket 8. A disc 2 is gripped by a spacer ring 9 and two annular discs 1 which are relatively arranged according to the invention like a roof and serve as clamping discs. Depending on the thickness $d$ of the spacer ring 9 the disc 2 may exercise a higher or lower pressure on the outer race of the ball bearing.

Figure 14:
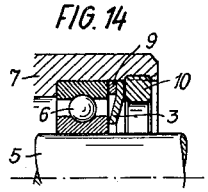

According to FIG. 14 the ball bearing 6 carried in the bearing body 7 on the shaft 5 is sealed at the inner race of the ball bearing with an annular disc 3, which is urged by a nut 10 against the outer race of the ball bearing with a spacer ring 9 and nut 10 interposed.

Figure 15:
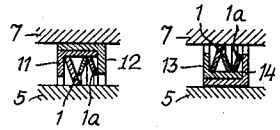
Figure 16:
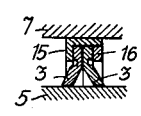

Effective seals may be formed by the elements according to the invention also in conjunction with plain bearings. This is shown in FIGS. 15 to 17, in which 5 is again the shaft and 7 the bearing body. In a socket shown in FIGS. 15 and 16 and composed of angle rings 11 and 12 or 13 and 14, which are forced against each other, a larger element 1 serving as a sealing disc is fixed together with smaller elements 1a serving as clamping discs. The socket with the discs forms a sealing set, which is inserted according to FIG. 15 in the bore of the bearing body 7 and the disc 1 of which seals against the shaft 1, whereas according to FIG. 16 the socket is fitted on the shaft 5 and the disc 1 acts on the bore of the bearing body 7.

According to FIG. 17 two annular discs 3 as shown in FIG. 5 are fixed in the socket consisting of the angle ring 15 and a retaining ring 16 forced into the same. Owing to their yieldingness provided by the recesses 3c these annular discs 3 will perfectly seal even an eccentrically running shaft 5.

Figure 18:
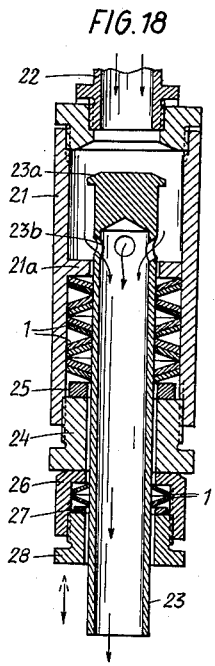

FIG. 18 shows the use of the machine element according to the invention in a liquid valve, which consists of the divided body 21, the inlet connection 22 and the tubular plug 23. The tubular plug 23 has in its closed end facing the casing a collar 23a and is formed below said collar with radial inflow openings 23b and is sealed and slidably guided in the casing by the alternatingly arranged discs 1. The degree of slidability can be controlled by the nut 24 through the intermediary of the metal intermediate ring 25, both of which surround the plug 23 with a clearance. By means of additional discs 1 a bushing 26 is clamped on the plug 23 by the intermediate ring 27 and the nut 28, which serves as an abutment and actuating handle. The axial pressure of the nut 28 imparts to the discs a radial stress, which holds the bushing 26 on the plug 23. When the plug 23 is in the position shown, the liquid flows in the direction indicated by the arrows through the valve whereas when the plug 23 is in its lower position, in which the collar 23a engages the partition 21a, the openings lie below the first four discs so that a passage of liquid is prevented. The passage is opened by pushing the plug 23 upwardly until the bushing 26 engages the nut 24. In this illustrative embodiment the discs 1 act at the same time as sealing, sliding and clamping elements.

Figure 19:
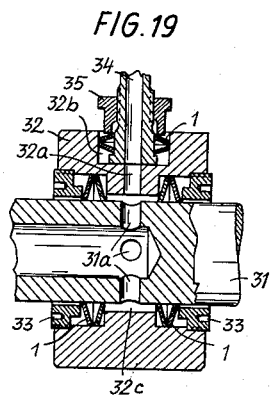

FIG. 19 shows the machine element according to the invention again as a sealing and clamping element for a central lubricating assembly for a shaft. The shaft 31 extends through a casing 32, in which it is sealed by the discs 1 arranged on both sides of the oil inlet bore 32a. The discs 1 are adjustable with respect to their sealing stress by means of the nuts 33. The inlet pipe 34 is held and sealed by means of additional discs 1 subjected to the pressure of the clamping nut 35 and disposed in a casing recess 32b arranged over the bore 32a. The oil flows through the pipe 34, the bore 32a, the annular space 32c in the casing and the radial bores 31a to the central bore 31b, from which it reaches the individual bearings of the shaft where the same is to be lubricated.

Figure 20:
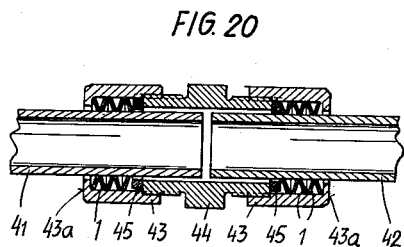

FIG. 20 shows a pipe coupling employing the elements according to the invention. The pipes 41 and 42 are fitted in sockets 43. Sets of elements 1, which are inclined toward each other in the shape of a roof, are arranged in the annular space between the pipes and sockets. The sockets 43 are first loosely screwed onto the coupling member 44 during the introduction of the pipes 41 and 42. When the sockets 43 are screwed to the intermediate coupling member 44 the thrust rings 45 exert axial pressure on the annular discs 1, which is taken up on the outside by the inwardly protruding flanges 43a. This causes a radial expansion of the discs 1 which then clamp and seal the tubes 41, 42 in the sockets 43.

Figure 21:
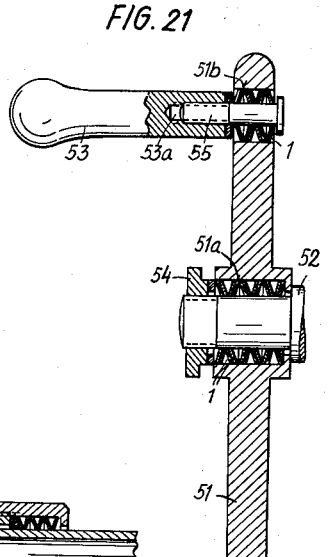

FIG. 21 shows the use of the discs 1 as a mere coupling element for fixing a handwheel 51 on a shaft 52 and for fixing the handle 53 in the handwheel 51. The disc sets 1 inserted in the handwheel bores 51a and 51b for gripping the shaft 52 and the handle 53 are radially extended by the axial pressure exercised by means of the nuts 54 and 53a, respectively. The resulting stress immovably holds the handwheel 51 on the shaft 52 and the handle bolt 55 with the handle 53. The use of the discs according to the invention, therefore, eliminates the need for any of the previously usual means such as profiled members, e.g., squares, keys and slots or the like.

Figure 22:
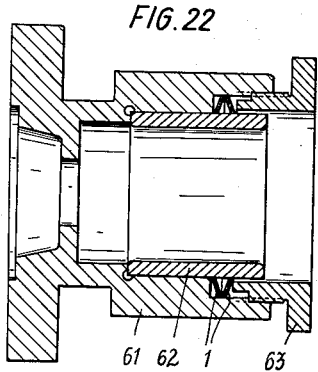

FIG. 22 shows an illustrative embodiment relating to the construction of jigs. 61 is the body of a gripping device for bushings 62 to be internally turned or ground. This body is affixed to the headstock and has a recess, which receives the bushings 62, which are gripped for the machining operation by means of the elements 1 when the nut 63 is tightened. After the nut has been loosened, the bushing 62 may be replaced by another workpiece 62. The clamping of the workpiece 62 by the discs 1 does not cause clamping marks on the workpiece.

Figure 23:
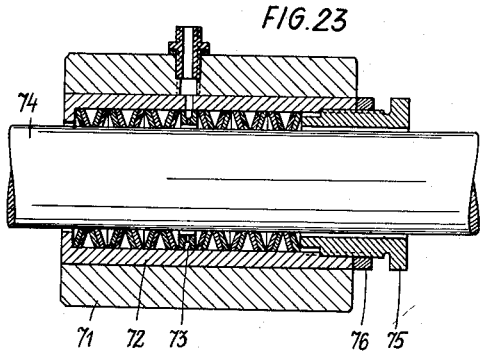

FIG. 23 shows the use of the elements according to the invention as pure sliding elements. The bearing body 71 contains the bushing 72, in which the elements 1 for rotatably mounting the shaft 74 are arranged in pairs of elements disposed like a roof. The lubricating ring 73 is inserted between the two groups. The bearing pressure is adjustable by means of the nut 75, which is fixed by the lock nut 76. The length of the bearing set formed by the elements 1 depends on the admissible load per unit area on the bearing. Any play which may result from wear can simply be eliminated by a readadjustment of the nut 75. The bearing parts 72, 73, 75 and 76 may be manufactured in quantity as an assembled unit.

I claim:

A coupling device comprising an inner member having a cylindrical outside periphery, an outer member having a cylindrical inside periphery defining an annular space with said outside periphery of said inner member, at least one full-walled annular disc of uniform thickness in the shape of a truncated cone and consisting of high-strength elastic plastic, said disc being disposed in said space, grooves provided adjacent to at least one of the rims of the disc to increase the elasticity of the disc, and means for effecting an adjustable axial pressure on said disc to urge said disc radially against said outside periphery of said inner member and said inside periphery of said outer member, effecting thereby a rotational coupling of the two members.

References Cited in the file of this patent

UNITED STATES PATENTS

| | | |
|---|---|---|
| 807,538 | Bole | Dec. 19, 1905 |
| 1,918,988 | Searles | July 18, 1933 |
| 1,958,089 | Leis | May 8, 1934 |
| 2,012,256 | Boudreau | Aug. 27, 1935 |
| 2,076,218 | Olden | Apr. 6, 1937 |
| 2,091,947 | Cords | Aug. 31, 1937 |
| 2,110,098 | Strecker | Mar. 1, 1938 |
| 2,236,370 | Jackman | Mar. 25, 1941 |
| 2,326,866 | Kincaid | Aug. 17, 1943 |
| 2,460,510 | Laesser | Feb. 1, 1949 |
| 2,571,560 | Gall | Oct. 16, 1951 |
| 2,707,108 | Schottler | Apr. 26, 1955 |
| 2,765,185 | Matt | Oct. 2, 1956 |
| 2,768,034 | Skinner | Oct. 23, 1956 |
| 2,798,748 | Maurer | July 9, 1957 |